US011756172B2

(12) United States Patent
Gresset et al.

(10) Patent No.: US 11,756,172 B2
(45) Date of Patent: Sep. 12, 2023

(54) LOCAL TONE MAPPING FOR HDR VIDEO

(71) Applicants: STMICROELECTRONICS (RESEARCH & DEVELOPMENT) LIMITED, Marlow (GB); STMICROELECTRONICS SA, Montrouge (FR)

(72) Inventors: Héloïse Eliane Geneviève Gresset, Versailles (FR); Brian Douglas Stewart, Edinburgh (GB)

(73) Assignees: STMICROELECTRONICS (RESEARCH & DEVELOPMENT) LIMITED, Marlow (GB); STMICROELECTRONICS SA, Montrouge (FR)

(*) Notice: Subject to any disclaimer, the term of this patent is extended or adjusted under 35 U.S.C. 154(b) by 139 days.

(21) Appl. No.: 17/168,106

(22) Filed: Feb. 4, 2021

(65) Prior Publication Data
US 2021/0264579 A1 Aug. 26, 2021

(30) Foreign Application Priority Data

Feb. 25, 2020 (EP) .................................. 20305180
Jan. 22, 2021 (EP) .................................. 21152878

(51) Int. Cl.
*G06T 5/00* (2006.01)
*G06T 5/50* (2006.01)
*H04N 23/741* (2023.01)
(52) U.S. Cl.
CPC ............... *G06T 5/009* (2013.01); *G06T 5/50* (2013.01); *G06T 2207/10016* (2013.01);
(Continued)

(58) Field of Classification Search
CPC . G06T 2207/20208; G06T 2207/20012; G06T 2207/20021; G06T 5/008;
(Continued)

(56) References Cited

U.S. PATENT DOCUMENTS 9,961,237 B2 * 5/2018 Atkins ..................... H04N 9/68
10,002,414 B2 * 6/2018 Ohno ................... H04N 1/4074
(Continued)

OTHER PUBLICATIONS

Duan, Jiang, et al. "Tone-mapping high dynamic range images by novel histogram adjustment." Pattern Recognition 43.5 (2010): 1847-1862. (Year: 2010).*
(Continued)

*Primary Examiner* — Li Liu
(74) *Attorney, Agent, or Firm* — SEED INTELLECTUAL PROPERTY LAW GROUP LLP

(57) ABSTRACT

The present disclosure relates to a tone mapping method for a succession of images implemented by an image processing device. The method including a) the division of the images of the succession of images in a plurality of sub-blocks of first pixels; b) for a first image (INPUT_IMAGE$_f$) of the succession of images, the creation of a first mini-image (MPIC$_f$) comprising pixels of the first mini-image, each pixel of the first mini-image representing a corresponding sub-block of the first image, the intensity of each pixel of the first mini-image being representative of the intensity of the first pixels of the corresponding sub-block; c) the storage of the first mini-image (MPIC$_f$) in a memory; and d) for a second image (INPUT_IMAGE$_{f+1}$) of the succession of images, the modification of the second image according to the first mini-image (MPIC$_f$) in order to generate an output image.

24 Claims, 7 Drawing Sheets

(52) U.S. Cl.
CPC ............. *G06T 2207/20021* (2013.01); *G06T 2207/20208* (2013.01); *H04N 23/741* (2023.01)

(58) Field of Classification Search
CPC . G06T 5/50; G06T 2207/10016; G06T 5/009; G06T 5/007; G06T 5/40; H04N 5/2355
See application file for complete search history.

(56) References Cited

U.S. PATENT DOCUMENTS

| | | | |
|---|---|---|---|
| 11,145,039 B2* | 10/2021 | Huang | G06T 5/20 |
| 11,212,480 B2* | 12/2021 | Gyurasz | H04N 5/57 |
| 11,238,571 B2* | 2/2022 | Yang | G06T 5/40 |
| 2007/0269132 A1 | 11/2007 | Duan et al. | |
| 2014/0152686 A1 | 6/2014 | Narasimha et al. | |
| 2015/0071537 A1 | 3/2015 | Lim et al. | |
| 2019/0080670 A1* | 3/2019 | Jung | G09G 5/10 |
| 2021/0295479 A1* | 9/2021 | Arnold | G06T 11/001 |

OTHER PUBLICATIONS

N. Zhang, C. Wang, Y. Zhao and R. Wang, "Deep tone mapping network in HSV color space," 2019 IEEE Visual Communications and Image Processing (VCIP), Sydney, NSW, Australia, 2019, pp. 1-4, doi: 10.1109/VCIP47243.2019.8965992. (Year: 2019).*
Know How to Transfer; URL=https://www.knowhowtransfer.com/photoshop-professional-plugins/next-local-contrast-enhancer/; download date Mar. 29, 2021.

* cited by examiner

LOCAL TONE MAPPING FOR HDR VIDEO

BACKGROUND

Technical Field

The present disclosure relates generally to a method of image processing and to an associated circuit. More specifically, the present disclosure relates to a method of tone mapping, and to an associated circuit for tone mapping.

Description of the Related Art

High-dynamic-range imaging (HDRI) is a high dynamic range (HDR) technique used in imaging and photography to reproduce a greater dynamic range of luminosity than that possible with standard digital imaging or photographic techniques. Such techniques may facilitate presenting a similar range of intensity to what is experienced through the human visual system.

The human eye, through adaptation of the iris and other methods, adjusts constantly to adapt to a broad range of intensities present in the environment. The brain continuously interprets this information so that a viewer can see in a wide range of light conditions.

Due to the limitations of printing and display contrast, the extended luminosity range of an HDR image has to be compressed to improve its visibility on Low Dynamic Range (LDR). The method of rendering an HDR image to a standard monitor or printing device is called tone mapping. This method reduces the overall contrast of an HDR image to facilitate display on devices or printouts with lower dynamic range and can be applied to produce images with preserved local contrast or exaggerated for artistic effect.

BRIEF SUMMARY

One embodiment provides a tone mapping method for a succession of images implemented by an image processing device, the method including: a) the division of the images of the succession of images in a plurality of sub-blocks of first pixels; b) for a first image of the succession of images, the creation of a first mini-image comprising pixels of the first mini-image, each pixel of the first mini-image representing a corresponding sub-block of the first image, the intensity of each pixel of the first mini-image being representative of the intensity of the first pixels of the corresponding sub-block; c) the storage of the first mini-image in a memory; d) for a second image of the succession of images, the modification of the second image according to the first mini-image in order to generate an output image.

According to an embodiment, the operation d) comprises for each first pixel of the second image: the computing of a context value, the context value depending on: the spatial proximity between the first pixel and the centers of the sub-blocks adjacent to the sub-block comprising the first pixel; and the affinity in intensity between the first pixel and the pixels of the first mini-image of the second image; the modification of the intensity of each first pixel according to the context value in order to generate the value of a pixel of the output image.

According to an embodiment, each pixel OUTPUT_Pq of the output image is equal to OUTPUT_Pq=GMPq*Pq, where Pq represents the value of any of the channel pf the pixel, OUTPUT_Pq represents the value of the corresponding channel in the output image, and the value GMPq is a gain value dependent on the context value.

According to an embodiment, the gain value GMPq is equal to GMPq=(LOCAL_GAIN$_{q-1}$)*GLOBAL_POWER+1, where GLOBAL_POWER is a value representing the power, or influence, of the modification by the process on the whole image and the value LOCAL_GAINq is the local contrast gain, computed based on the image LOGY_IMAGEf and the mini-image MPICf−1.

According to an embodiment, the method further comprises storing the output image in the memory or another memory or displaying the output image.

According to an embodiment, each sub-block comprises at least two first pixels.

According to an embodiment, in operation b), the intensity of each pixel of the first mini-image is computed based on an average of the intensities of the first pixels of the corresponding sub-block.

According to an embodiment, in operation b), the intensity of each pixel of the first mini-image is computed based on: the average of the intensities of the first pixels in a square centered on the corresponding sub-block, the size of the square being equal to k times the size of the sub-block, k being a number between 0 and 2, not including 0; or the average of the intensities of the first pixels in a circle centered on the corresponding sub-block, the radium of the circle being equal to k times the size of the sub-block, k being a number between 0 and 2, not including 0.

According to an embodiment, the first mini-image used for the generation of the output image is erased from the memory after the generation of the output image.

According to an embodiment, operation b) is applied to all the images of the succession of images.

According to an embodiment, the modification of the first pixels is independent of the context value if: the intensity of the pixel is above a first threshold, or below a second threshold; and/or the first pixel is a color pixel and the intensity of one of the color of the first pixel is above a third threshold; and/or the accuracy of the context value is below a fourth threshold.

According to an embodiment, the intensity of the pixels of the first mini-image is computed, in operation b), based on the logarithmic value of the intensity of the first pixels of the corresponding sub-block.

Another embodiment provides a computer-readable non-transitory storage medium storing instructions that, when executed by a processing device, cause one or more of the methods disclosed herein to be implemented.

Another embodiment provides an image processing device for tone mapping a succession of images, each image being divided into a plurality of sub-blocks of first pixels, comprising: a circuit configured to: for a first image, create a first mini-image comprising pixels of the first mini-image, each pixel of the first mini-image representing a corresponding sub-block of the first image, the intensity of each pixel of the first mini-image being representative of the intensity of the first pixels of the corresponding sub-block; and for a second image of the succession of images, the modification of the second image according to the first mini-image in order to generate an output image, at least one memory configured to store the second image created by the circuit.

According to an embodiment, the circuit is configured to: compute a context value, the context value depending on: the distances between the first pixel and the centers of the sub-blocks adjacent to the sub-block comprising the first pixel; and the differences in intensity between the pixel of the first mini-image corresponding to the first pixel and the adjacent pixels of the first mini-image of the second image created during the reading of the first image, and modify the intensity of each first pixel according to the context value in order to generate the intensity of a pixel of the output image.

In an embodiment, a tone mapping method of an image processing device comprises: dividing a first image of a succession of images into a plurality of sub-blocks of pixels; generating a first mini-image comprising pixels, each pixel of the first mini-image representing a corresponding sub-block of the first image, an intensity of each pixel of the first mini-image being representative of an intensity of the pixels of the corresponding sub-block; storing, the first mini-image in a memory; and modifying a second image of the succession of images based on the first mini-image, generating an output image. In an embodiment, the modifying comprises for each pixel of the second image: computing of a context value, the context value depending on: a spatial proximity between the pixel and centers of the sub-blocks adjacent to the sub-block comprising the pixel; and an affinity in intensity between the pixel and the pixels of the first mini-image; and using the context value to generate a value of a pixel of the output image. In an embodiment, each pixel OUTPUT_$P_q$ of the output image is equal to OUTPUT_$P_q$=$GMP_q$*$P_q$, where $P_q$ represents a value of a channel of the pixel, OUTPUT_$P_q$ represents a value of the corresponding channel in the output image, and the value $GMP_q$ is a gain value dependent on the context value. In an embodiment, the gain value $GMP_q$ is equal to $GMP_q$=(LOCAL_$GAIN_q$-1)*GLOBAL_POWER+1, where GLOBAL_POWER is a value representing an influence of the modification on the whole image and the value LOCAL_$GAIN_q$ is a local contrast gain, computed based on a logarithmic representation of the second image and the mini-image of the first image. In an embodiment, the method comprises storing the output image in the memory or another memory or displaying the output image. In an embodiment, each sub-block comprises at least two pixels. In an embodiment, the intensity of each pixel of the first mini-image is computed based on an average of the intensities of the pixels of the corresponding sub-block. In an embodiment, the intensity of each pixel of the first mini-image is computed based on: an average of the intensities of the pixels in a square centered on the corresponding sub-block, the size of the square being equal to k times the size of the sub-block, k being a number between 0 and 2, not including 0; or the average of the intensities of the pixels in a circle centered on the corresponding sub-block, the radius of the circle being equal to k times the size of the sub-block, k being a number between 0 and 2, not including 0. In an embodiment, the first mini-image used for the generation of the output image is erased from the memory after the generation of the output image. In an embodiment, a respective mini-image is generated for all the images of the succession of images. In an embodiment, the modification of the pixels is independent of a context value if: the intensity of the pixel is above a first threshold, or below a second threshold; the pixel is a color pixel and the intensity of one of the colors of the pixel is above a third threshold; an accuracy of the context value is below a fourth threshold; or combinations thereof. In an embodiment, the intensity of the pixels of the first mini-image is computed based on a logarithmic value of the intensity of the pixels of the corresponding sub-block.

In an embodiment, a device comprises: a memory; and image processing circuitry coupled to the memory, wherein the image processing circuitry, in operation: divides a first image of a succession of images into a plurality of sub-blocks of pixels; generates a first mini-image comprising pixels, each pixel of the first mini-image representing a corresponding sub-block of the first image, an intensity of each pixel of the first mini-image being representative of an intensity of the pixels of the corresponding sub-block; stores the first mini-image; and applies tone mapping to a second image of the succession of images based on the first mini-image, generating an output image. In an embodiment, the image processing circuitry, in operation, for each pixel of the second image: computes a context value, the context value depending on: a spatial proximity between the pixel and centers of the sub-blocks adjacent to the sub-block comprising the pixel; and an affinity in intensity between the pixel and the pixels of the first mini-image; and uses the context value to generate a value of a pixel of the output image. In an embodiment, each pixel OUTPUT_$P_q$ of the output image is equal to OUTPUT_$P_q$=$GMP_q$*$P_q$, where $P_q$ represents a value of a channel of the pixel, OUTPUT_$P_q$ represents a value of the corresponding channel in the output image, and the value $GMP_q$ is a gain value dependent on the context value. In an embodiment, the gain value $GMP_q$ is equal to $GMP_q$=(LOCAL_$GAIN_q$-1)*GLOBAL_POWER+1, where GLOBAL_POWER is a value representing an influence of the modification on the whole image and the value LOCAL_$GAIN_q$ is a local contrast gain, computed based on a logarithmic representation of the second image and the mini-image of the first image. In an embodiment, each sub-block comprises a plurality of pixels. In an embodiment, the intensity of each pixel of the first mini-image is computed based on an average of the intensities of the pixels of the corresponding sub-block. In an embodiment, the intensity of each pixel of the first mini-image is computed based on: an average of the intensities of the pixels in a square centered on the corresponding sub-block, the size of the square being equal to k times the size of the sub-block, k being a number between 0 and 2, not including 0; or an average of the intensities of the pixels in a circle centered on the corresponding sub-block, the radius of the circle being equal to k times the size of the sub-block, k being a number between 0 and 2, not including 0. In an embodiment, the image processing circuitry, in operation, replaces the first mini-image used for the generation of the output image with a mini-image of the second image after the generation of the output image. In an embodiment, the image processing circuitry, in operation, successively generates a respective mini-image for the images of the succession of images. In an embodiment, the image processing circuitry, in operation, computes the intensity of the pixels of the first mini-image based on a logarithmic value of the intensity of the pixels of the corresponding sub-block.

In an embodiment, a system comprises: a display, which, in operation, displays images; and image processing circuitry coupled to the display, wherein the image processing circuitry, in operation: divides a first image of a succession of images into a plurality of sub-blocks of pixels; generates a first mini-image comprising pixels, each pixel of the first mini-image representing a corresponding sub-block of the first image, an intensity of each pixel of the first mini-image being representative of an intensity of the pixels of the corresponding sub-block; stores the first mini-image; and applies tone mapping to a second image of the succession of images based on the first mini-image, generating an output image. In an embodiment, the display, in operation, displays the output image. In an embodiment, the image processing circuitry, in operation, for each pixel of the second image: computes a context value, the context value depending on: a spatial proximity between the pixel and centers of the sub-blocks adjacent to the sub-block comprising the pixel; and an affinity in intensity between the pixel and the pixels of the first mini-image; and uses the context value to generate a value of a pixel of the output image.

In an embodiment, z non-transitory computer-readable medium's contents cause image processing circuitry to perform a tone mapping method, the tone mapping method comprising: dividing a first image of a succession of images into a plurality of sub-blocks of pixels; generating a first mini-image comprising pixels, each pixel of the first mini-image representing a corresponding sub-block of the first image, an intensity of each pixel of the first mini-image being representative of an intensity of the pixels of the corresponding sub-block; storing, the first mini-image in a memory; and modifying a second image of the succession of images based on the first mini-image, generating an output image. In an embodiment, the modifying comprises for each pixel of the second image: computing of a context value, the context value depending on: a spatial proximity between the pixel and centers of the sub-blocks adjacent to the sub-block comprising the pixel; and an affinity in intensity between the pixel and the pixels of the first mini-image; and using the context value to generate a value of a pixel of the output image. In an embodiment, the contents comprise instructions executed by the image processing circuitry.

BRIEF DESCRIPTION OF THE SEVERAL VIEWS OF THE DRAWINGS

The foregoing features and advantages, as well as others, will be described in detail in the following description of specific embodiments given by way of illustration and not limitation with reference to the accompanying drawings, in which.

DETAILED DESCRIPTION

Figure 1:
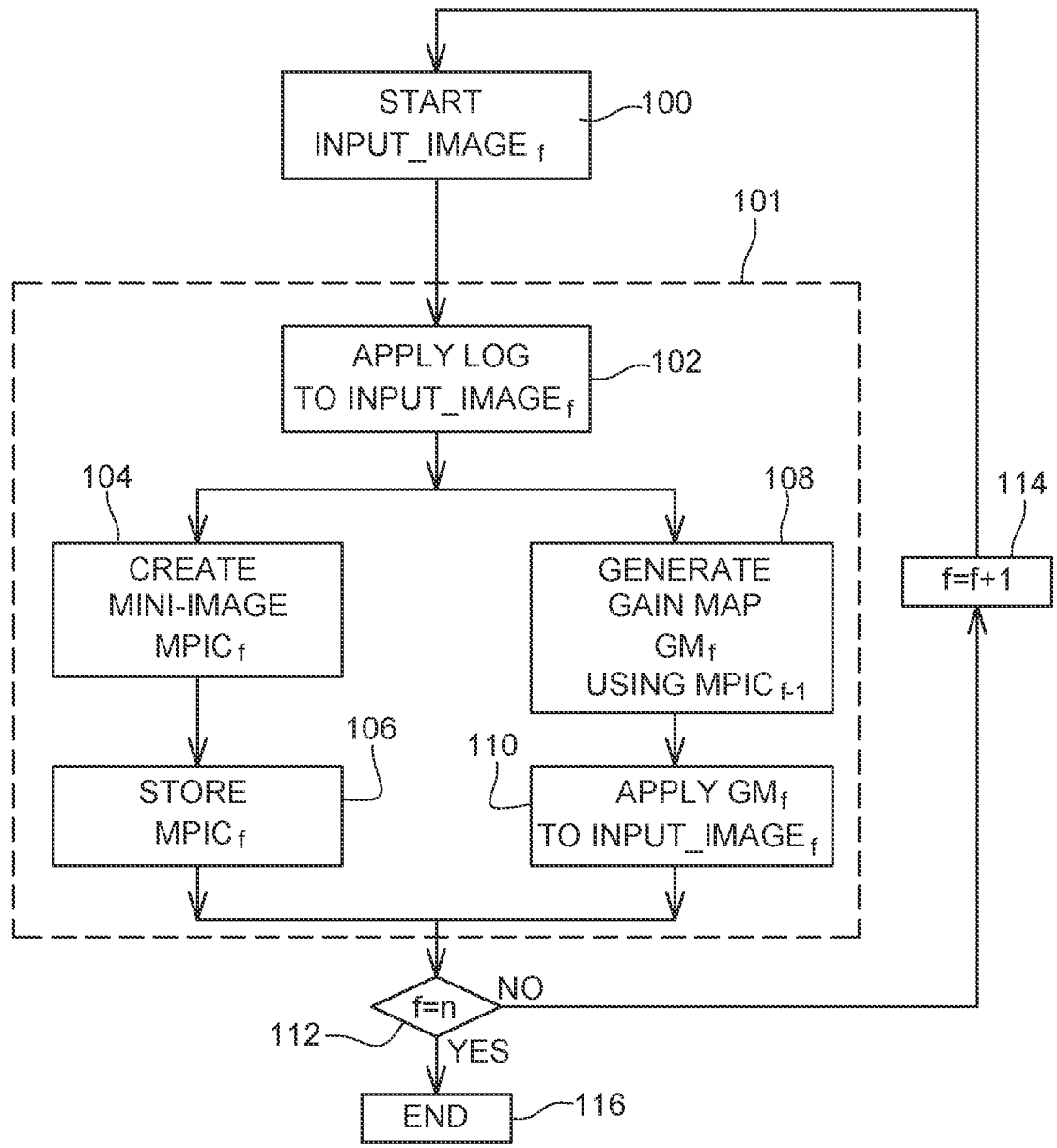
FIG. 1 is a flow diagram illustrating an embodiment of a method of tone mapping.

Like features have been designated by like references in the various figures. In particular, the structural and/or functional features that are common among the various embodiments may have the same references and may dispose identical structural, dimensional and material properties.

For the sake of clarity, only the operations and elements that are useful for an understanding of the embodiments described herein have been illustrated and described in detail.

Unless indicated otherwise, when reference is made to two elements connected together, this signifies a direct connection without any intermediate elements other than conductors, and when reference is made to two elements linked or coupled together, this signifies that these two elements can be connected or they can be linked or coupled via one or more other elements.

In the following disclosure, unless indicated otherwise, when reference is made to absolute positional qualifiers, such as the terms "front", "back", "top", "bottom", "left", "right", etc., or to relative positional qualifiers, such as the terms "above", "below", "higher", "lower", etc., or to qualifiers of orientation, such as "horizontal", "vertical", etc., reference is made to the orientation shown in the figures.

Unless specified otherwise, the expressions "around", "approximately", "substantially" and "in the order of" signify within 10%, within 5%, etc.

For ease of reading, the following table summarizes the various references and variables used, in particular in the equations.

TABLE 1

| | |
|---|---|
| $INPUT\_IMAGE_f$ | The current image to which the process is applied |
| f | The index of the current image |
| n | The number of successive images |
| $P_q$ | The current pixel in the image $INPUT\_IMAGE_f$ |
| q | The index of the current pixel |
| x | The index of column of the pixel $P_q$ in the image $INPUT\_IMAGE_f$ |
| ROW | The number of rows in the image $INPUT\_IMAGE_f$ |
| y | The index of row of the pixel $P_q$ in the image $INPUT\_IMAGE_f$ |
| COL | The number of columns in the image $INPUT\_IMAGE_f$ |
| $Y_q$ | The brightness intensity of the pixel $P_q$ |
| $LOGY\_IMAGE_f$ | The image obtained by the application of the logarithmic function on the value of the brightness intensity of each pixel of the image $INPUT\_IMAGE_f$ |
| $LP_q$ | The pixel of the image $LOGY\_IMAGE_f$ corresponding to the pixel $P_q$ |
| $LY_q$ | The intensity value of the pixel $LP_q$ and the logarithmic value of the brightness intensity of the pixel $P_q$. This value is coded on fbw bits |
| $MPIC_f$ | The mini-image of the current image $INPUT\_IMAGE_f$ |
| $PM_b$ | The pixel of the mini-image $MPIC_f$ of the current image $INPUT\_IMAGE_f$ |
| $LYM_b$ | The value of the pixel $PM_b$, for example equal to an average of the values $LY_q$ of the pixel $LP_q$ |
| b | The index of the current pixel of the mini-image $MPIC_f$ |
| sb | The number of pixels in the mini-image $MPIC_f$ |
| $GM_f$ | The gain map of the current image $INPUT\_IMAGE_f$ |
| $GMP_q$ | The gain value of the gain map corresponding to the pixel $P_q$ of the input image $INPUT\_IMAGE_f$ |
| $OUTPUT\_IMAGE_f$ | The output image of the process, generated by applying the gain map to the input image |
| $OUTPUT\_P_q$ | The pixel of the output image corresponding to the pixel $P_q$ of the input image |
| $LOCAL\_GAIN_q$ | The value of the local contrast gain to be applied to pixel $P_q$ |
| $GLOBAL\_POWER$ | The value representative of the power of the global modification of the image |
| $LOCAL\_POWER$ | The value representative of the power of the local contrast enhancement of the pixels |
| $CTX_q$ | The value representing the context of the current pixel |
| $CLIP\_GAIN$ | The value representative of a threshold above which the difference between the context value and the value of the pixel is considered too high to be considered in the gain computation |
| fbw | The value is the number of bits used t code the decimal part of the pixels value $LY_q$. The value is equal to the number of bits used to code the pixel value $LY_q$ minus the number of bits used to code the integer part of pixel value |
| $R_b$ | The current sub-block of the image $LOGY\_IMAGE_f$, corresponding to the current pixel $PM_b$ of the mini-image |
| $R_b'$ | The group 160 (see FIG. 4) corresponding to the pixel $PM_b$ |
| m | The size of a sub-block |
| h | The size of a group of pixels surrounding a sub-block |
| k | A ratio, chosen by a user, between the size of a sub-block and the size of a group of pixels surrounding a sub-block |

TABLE 1-continued

| | |
|---|---|
| INPUT_IMAGE$_f$ | The current image to which the process is applied |
| $\Sigma R_b'$ | The cumulative sum of the values of the pixels of the group $R_b'$ |
| Q | The number of pixels in the image LOGY_IMAGE$_f$ |
| i | The index of the sub-block corresponding to the spatial proximity |
| $d_i$ | The spatial proximity between the current pixel and the sub-block $R_i$, for example in the range from 0 to 1. |
| $\delta_i$ | The distance between the current pixel and the center of the sub-block $R_i$ |
| $D_{max}$ | An arbitrary distance, for example preprogrammed in a memory |
| $a_j$ | The affinity between the current pixel and a pixel $PM_j$ of the mini-image, for example in the range from 0 to 1. |
| j | The index of the pixel $PM_j$ corresponding to the affinity |
| aff_factor | A variable in the computation of the affinity, for example in the range from 0 to 1, zero being excluded. |
| r | The dynamic range of the image. In other words, the difference between the highest and the lowest value of the histogram of the image LOGY_IMAGE$_{f-1}$ |
| Likelihood$_q$ | The likelihood that the estimated context value is an accurate representation of the context of the pixel, for example in the range from 0 to 1. |
| ECTX$_q$ | The estimated context value |
| Bias$_q$ | A value used to avoid saturation of the brightest pixels and the darkest pixels, for example in the range from 0 to 1. |
| Confidence$_q$ | The confidence in the estimated context, for example in the range from 0 to 1. |
| Greyness$_q$ | A parameter used to avoid increasing a color value in order to prevent color saturation, for example in the range from 0 to 1. |
| normP$_q$ | The normalized value of the pixel $P_q$ |
| $b_q$ | A value representative of a threshold distance from the extremity of the intensity range |

FIG. 1 is a flow diagram illustrating an embodiment of a method, or process, of tone mapping. More specifically, FIG. 1 illustrates operations of a process of local tone mapping, meaning a process in which each pixel of an image can be modified depending on the pixels adjacent to or surrounding said pixel. Local tone mapping is to be distinguished from global tone mapping, in which the modification of each pixel is defined only by global statistics from the whole image.

The embodiment of FIG. 1 is implemented by a circuit of an electronic device, such as an image processing device. An example of a circuit implementing the process is described below with reference to FIG. 9. This process is, for example, part of a larger process of image processing implemented in the electronic device. The larger process can for example include processes of global tone mapping and other processes of local tone mapping. The larger process can also include operations of pre- and post-processing, which are for example standard processes and will not be described in detail herein. Alternatively, the process can be implemented within a sensor.

The electronic device for example comprises an image sensor configured to capture a sequence of successive images, for example the electronic device is an image sensor capable of capturing video. The image sensor is for example in a video camera.

The process is used on a group of successive images. The group of images comprises at least two successive images. Each couple of two successive images is comprised of images of substantially the same scene at two different instants. for example, the two different instants are two close instants, for example less than 300 ms apart. For example, several of the successive images are taken every second. In an embodiment, the group of images corresponds to the various frames of a video. The frames are for example less than 50 ms apart, for example 15 ms or 30 ms apart.

The process can be used with greyscale images, color images, or hyperspectral images. In the case of color images or hyperspectral images, the process may be applied to an intensity image computed from the color or hyperspectral image. The intensity is a weighted combination of the various channels of the image. The result of the process is then applied to the initial color or hyperspectral image. Alternatively, instead of the intensity image, the process can be applied to an image computed by extracting the information of one of the channels of the color or hyperspectral image.

The process of FIG. 1 is used on a plurality of successive input images INPUT_IMAGE$_f$, where f is an integer going from 0 to n−1, and where n is the total number of successive images. The integer f corresponds to the position of the image in the succession of images. Thus, the image INPUT_IMAGE$_f$ directly precedes the image INPUT_IMAGE$_{f+1}$. For example, the image INPUT_IMAGE$_4$ precedes the image INPUT_IMAGE$_5$.

Each input image INPUT_IMAGE$_f$ comprises an array of pixels $P_q$, the value q being the number of the pixel in the order in which the pixels are read out from an image sensor. For example, the pixels are read in each row from left to right, and from the top row to the bottom row. Thus, the value q is equal to: q=COL*y+x, COL being the number of columns in the array, y being the index of row of the pixel $P_q$ and x being the index of column of the pixel $P_q$ in the array. The index x goes from 0 to COL-1. The index y goes from 0 to ROW-1, ROW being the number of rows in the array.

The images INPUT_IMAGE$_f$ are for example images created by a Bayer sensor. The images are for example usual camera images, such as high dynamic range images (HDR images), having a bit depth for example superior or equal to 8, such as greater than 8, for example superior or equal to 16, for example superior or equal to 24, for example superior or equal to 32. In other words, the intensity $Y_q$ of each pixel $P_q$ is coded on at least 8 bits, for example on at least 16 bits, for example on at least 24 bits, for example on at least 32 bits. Thus, the intensity of each pixel can for example be one of at least $2^8$ values, for example one of at least $2^{16}$ values, for example one of at least $2^{24}$ values, for example one of at least $2^{32}$ values.

The successive images have for example substantially the same dimensions, and may have exactly the same dimensions. The dimensions of the images may be such that each image can be divided in an array of squares.

The process is described once for an image INPUT_IMAGE$_f$, f being a number between 2 and n. At the start of the process, the pixel of the image INPUT_IMAGE$_f$ starts being read, and therefore the circuit implementing the process starts to receive the values of the pixels $P_q$ of the image INPUT_IMAGE$_f$ (block 100, START INPUT_IMAGE$_f$). The pixels $P_q$ have for example already been through other processes, for example through a preprocessing.

The circuit implementing the image processing receives successively the intensity $Y_q$ corresponding to each pixel $P_q$ of the image, pixel by pixel, in an order corresponding to the incrementation of the number q. In other words, the pixel $P_q$ is read before the pixel $P_{q+1}$. The brightness intensity $Y_q$ of the pixel $P_q$ is computed for each pixel read. The brightness intensity $Y_q$ of the pixel $P_q$ is for example computed as a linear combination of the available channels of INPUT_IMAGE$_f$. For example, in the case of a greyscale image, the intensity is equal to the value of the pixel. For example, in the case of a color image, the intensity is a linear combination of the values of the red channel, the blue channel and the green channel.

A group 101 of steps of the process is performed on each pixel $P_q$ as they are read. Thus, the various steps of the group 101 are all carried out on the pixel $P_q$, then on the pixel $P_{q+1}$, etc. The steps of the group 101 are described only once, in regard with a pixel $P_q$, the steps being reiterated for each pixel of the image INPUT_IMAGE$_f$.

During a step represented by the block 102 (APPLY LOG TO INPUT_IMAGE$_f$) of the group 101, a logarithmic function, for example, with base two, is applied to the intensity of the current pixel. This operation results in a value $LY_q$. The value $LY_q$ corresponds to the logarithmic value of the intensity of the pixel $P_q$. The value $LY_q$ corresponds to the intensity of a pixel $LP_q$ of an image LOGY_IMAGE$_f$. The image LOGY_IMAGE$_f$ correspond to the image INPUT_IMAGE$_f$ after computation of the intensity and application of the logarithmic function to each pixel. The image LOGY_IMAGE$_f$ comprises the same number of pixels as the image INPUT_IMAGE$_f$, each pixel $P_q$ corresponding to a pixel $LP_q$.

This logarithmic value is used to create a mini-image MPIC$_f$ and to generate a gain map GM$_f$, which will be used to obtain an output image. The creation of the mini-image may be carried out in parallel with the generation of the gain map.

Using the logarithmic value has the advantage of simplifying the computations. Indeed, operations of multiplication and division applied to the value $Y_q$ are equivalent to operations of addition and subtraction on the value $LY_q$, the operations of addition and subtraction being easier and less costly to implement. Furthermore, the use of the logarithmic value increases the stability of the video where highly contrasted object of the screen appear close to each other.

More specifically, the group 101 comprises an operation represented by the block 104 (CREATE MINI-IMAGE MPIC$_f$).

During operation 104, a mini-image MPIC$_f$ based on the image LOGY_IMAGE$_f$, is created. The mini-image MPIC$_f$ comprises an array of pixels PM$_b$, where b is in the range from 0 to sb−1, sb being the number of pixels in the mini-image, the value b being the number of the pixel of the mini-image in the order in which the pixels are processed. For example, the pixels are read in each row from left to right, and from top row to bottom row. The mini-image MPIC$_f$ is a reduced, or subsampled, image having a number of pixels PM$_b$ less than the number of pixels of the image LOGY_IMAGE$_f$. Each pixel of the mini-image is representative of the intensity of a plurality of pixels of the corresponding image LOGY_IMAGE$_f$. For example, each pixel of the mini-image represents the average of the plurality of pixels located in the same region of the image LOGY_IMAGE$_f$.

The mini-image is for example a greyscale image. Each pixel PM$_b$ of the mini-image MPIC$_f$ for example corresponds to an intensity LYM$_b$. The value of the intensity LYM$_b$ of each pixel of the mini-image is for example representative of the intensity of a sub-block $R_b$ of pixels of the image LOGY_IMAGE$_f$. The mini-image is a sub-sampled version of the image LOGY_IMAGE$_f$.

The mini-image MPIC$_f$ is of finite size and may be far smaller than the image INPUT_IMAGE$_f$. The mini-image MPIC$_f$ comprises for example at least 16 pixels, for example at least 576 pixels. The mini-image MPIC$_f$ comprises for example between 1000 and 5000 times less pixels than the image LOGY_IMAGE$_f$. Each pixel of the image LOGY_IMAGE$_f$ is associated with at least a pixel of the mini-image MPIC$_f$. For example, each pixel of the image LOGY_IMAGE$_f$ can be associated with only one pixel of the mini-image MPIC$_f$.

In the case that the operations are carried out pixel by pixel, the operation represented by the block 104 corresponds, for each pixel, to the updating of the mini-image. This step will be described in more detail in relation with FIGS. 3 and 4.

The step represented by the block 104 is followed by an operation represented by a block 106 (STORE MPIC$_f$), in which the mini-image MPIC$_f$ is stored in a memory. In other words, the value(s) of the pixel, or pixels, of the mini-image updated during the operation represented by block 104 is/are stored, for example, in the same memory location as of the same pixel before having been updated. The values of the pixels of the image INPUT_IMAGE$_f$ and of the image LOGY_IMAGE$_f$ need not necessarily be stored.

In parallel with operations 104 and 106, the process for example comprises an operation 108 in which the gain map is created (block 108, GENERATE GAIN MAP GM$_f$ USING MPIC$_{f-1}$) and an operation 110 in which the gain map is applied on the image INPUT_IMAGE$_f$ (block 110, APPLY GM$_f$ TO INPUT_IMAGE$_f$).

The gain map GM$_f$ is an array of gain values GMP$_q$, each gain value GMP$_q$ corresponding to a pixel $P_q$ of the image INPUT_IMAGE$_f$. The values of the gain map are generated based on the image LOGY_IMAGE$_f$ and on the mini-image MPIC$_{f-1}$. The generation of the gain map will be described in more detail below.

The operation represented by block 110 generates an output image OUTPUT_IMAGE$_f$.

More specifically, during the operation represented by block 108, the gain value GMP$_q$, corresponding to the current pixel $P_q$, is generated based on the image LOGY_IMAGE$_f$ and more specifically, based on the value of the pixel $P_q$, and the mini-image MPIC$_{f-1}$. Only one gain value GMP$_q$ is generated for each iteration of the operations of the group 101.

During the operation represented by block 110, the value of each pixel $P_q$ of the input image INPUT_IMAGE$_f$ is for example multiplied with the corresponding gain value GMP$_q$ of the gain map OUTPUT_IMAGE$_f$. The values of the pixels OUTPUT_P$_q$ of the output image are equal to: OUTPUT_P$_q$=GMP$_q$*P$_q$, where P$_q$ represents the value of the pixel, and OUTPUT_P$_q$ represents the value of the pixel in the output image. For example, if the image is a color image or a hyperspectral image, the gain value is multiplied with the values of all the channels. The value of the gain GMP$_q$ determines the gain or attenuation to be applied on the pixel.

The gain value GMP$_q$ may be erased after the generation of the output pixel OUTPUT_P$_q$. The values of the gain map do not need to be stored.

Each value of the gain map may be computed as follows:

$$GMP_q=(LOCAL\_GAIN_q-1)*GLOBAL\_POWER+1,$$

where GLOBAL_POWER is a value representing the power, or degree of influence, of the modification by the process on the whole image and the value LOCAL_GAIN$_q$ is the local contrast gain, computed based on the image LOGY_IMAGE$_f$ and the mini-image MPIC$_{f-1}$.

The value GLOBAL_POWER is for example the same for all the pixels of an image and may be the same for all the images of the sequence of images. The value GLOBAL_POWER is for example chosen by the user or is programmed during the programing of the process, and may be preprogrammed. For example, the value GLOBAL_POWER is greater than 0, for example in the range from 0 to 2, where the value 0 may not be included. If the value GLOBAL_POWER was equal to 0, the gains $GMP_q$ would all be equal to 1 and the output image would be identical to the input image. In other words, if the value GLOBAL_POWER was equal to 0, the method of tone mapping would have no impact on the images.

The value $LOCAL\_GAIN_q$ may be computed as follows:

$$LOCAL\_GAIN_q = 1 + LOCAL_{POWER} * \min\left(1, \max\left(-1, \frac{LY_q - CTX_q}{CLIP_{GAIN} * 2^{fbw}}\right)\right),$$

where:
LOCAL_POWER is a value representing the power, or influence, of the local modification by the process on the pixels,
$CTX_q$ is a context value, representative of the context of the pixel $LP_q$ in the image $LOGY\_IMAGE_f$,
CLIP_GAIN is the acceptable difference between the logarithmic value $LY_q$ of the pixel $P_q$ and the corresponding context value $CTX_q$, in other words, CLIP_GAIN is a threshold above which the difference between the context value and the value of the pixel is too high to be considered in the gain computation, and
fbw is a value corresponding to the number of bits used to code the decimal part considered when using a logarithmic function on the value.

The values LOCAL_POWER, CLIP_GAIN, and fbw are for example the same for all the pixels of an image and for example the same for all the images of the sequence of images. The values LOCAL_POWER, CLIP_GAIN, and fbw are for example chosen by the user or are programmed during the programing of the process. For example, the value LOCAL_POWER, is in the range from −5 to 5. If the value LOCAL_POWER is negative, the local contrast will be diminished and if the value LOCAL_POWER is positive, the local contrast will be increased. For example, the value LOCAL_POWER, is equal to 1. For example, the value CLIP_GAIN, is higher than 0, for example, substantially equal to 2. For example, the value fbw is equal to or higher than 12.

The computation of the value $CTX_q$ will be described in more detail in relation with FIGS. 5, 6 and 7. The value $CTX_q$ is dependent on the spatial proximity and the affinity of the pixel with the other pixels.

As each input image is taken by the sensor at an instant sufficiently close to the instant of the previous image, the mini-images of two successive instants are similar enough that the mini-image $MPIC_{f-1}$ can be used in the operation of tone mapping the following image $INPUT\_IMAGE_f$ taken at an instant directly after the instant in which the mini-image $MPIC_{f-1}$ was created. The mini-image $MPIC_{f-1}$ is the result of a heavy subsampling of the image $LOGY\_IMAGE_{f-1}$. The successive images are for example taken quickly one after another. Therefore, changes in the scene usually induce very small, almost unnoticeable, changes in the mini-images from one image to the other.

After the mini-image $MPIC_{f-1}$ is used for the tone mapping of image $INPUT\_IMAGE_f$, the mini-image $MPIC_{f-1}$ may be erased from the memory. Thus, there may be at most two mini-images stored at any one time during the process in an embodiment, one being the mini-image being created and the other being the mini-image being used for the gain map.

In some embodiments, other processes are applied to the output image $OUTPUT\_IMAGE_f$, for example other processes of tone mapping and post processing. The output image $OUTPUT\_IMAGE_f$ is then for example displayed and/or stored by the device.

In the case that the operations of the group 101 are applied to the image $INPUT\_IMAGE_f$ pixel by pixel, the operation of modification (bloc 110) of the pixels of the image $INPUT\_IMAGE_f$ is for example applied dynamically to the pixels as they are read.

If the image $INPUT\_IMAGE_f$ processed is not the last image of the sequence of successive images (branch NO, operation 112, f=n), the value of the index f is incremented by 1 (block 114, f=f+1). The process, starting with operation 100 is applied on the new image $INPUT\_IMAGE_f$, corresponding to the next image of the succession of images.

In other words, if the integer f is not equal to the integer n, n being the number of successive images $INPUT\_IMAGE_f$, the process of tone mapping is applied to the new image $INPUT\_IMAGE_f$.

If the image processed was the last image (branch YES, operation 112, f=n), the process is finished (block 116, END).

In order to modify an image $INPUT\_IMAGE_f$, a mini-image $MPIC_{f-1}$ generated based on the previous image $LOGY\_IMAGE_{f-1}$ is used. As such, at least one of the first images of the sequence of images is not modified, but is used to generate a mini-image.

For example, the first images are not displayed or stored. For example, one of the first images is used to create a mini-image but is not displayed or used to generate an output image.

The method of FIG. 1 can be implemented in software, for example by instructions stored on a computer-readable non-transitory storage medium. See, e.g., the microprocessor 402 of FIG. 10.

Figure 2:
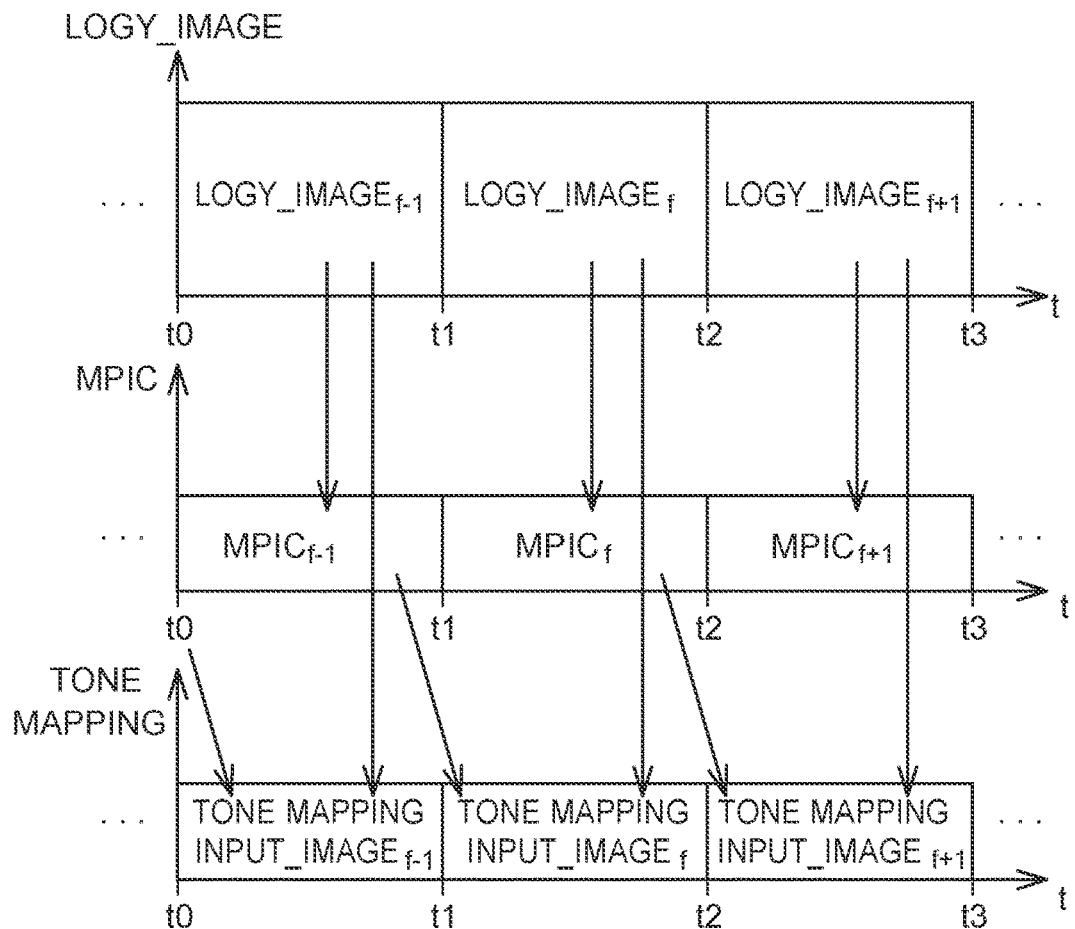
FIG. 2 is a flow diagram illustrating the operations of the embodiment of FIG. 1 during cycles of the method.

FIG. 2 is a timing diagram illustrating the operation of the embodiment of FIG. 1 during three cycles of the method, in other words during processing of three successive images. FIG. 2 represents the image (LOGY_IMAGE) being read (blocks 100 and 102 of FIG. 1), the mini-image (MPIC) being created (block 104 of FIG. 1) and the gain map (TONE MAPPING) being applied to an image, as a function of time (t).

At an instant t0, an image $IMAGE_{f-1}$ is captured by the image sensor and the values of the pixels are used to generate the values of the pixels of the image $LOGY\_IMAGE_{f-1}$ (block 102 of FIG. 1).

Between the instant t0 and an instant t1, the image $INPUT\_IMAGE_{f-1}$ is read and processed and the image $LOGY\_IMAGE_{f-1}$ is generated. In other words, the voltage generated by each pixel is received by the circuit and thus the value of the various pixels is provided to the circuit implementing the method and a logarithmic function is applied.

Between the instant t0 and an instant t1, the mini-image $MPIC_{f-1}$ is also created based on the image $LOGY\_IMAGE_{f-1}$ (block 104 of FIG. 1). Furthermore, the gain map $GM_{f-1}$ is generated (block 108 of FIG. 1), in parallel with the generation of the mini-image $MPIC_{f-1}$, based on the image $LOGY\_IMAGE_{f-1}$ and the mini-image $MPIC_{f-2}$ (not represented) generated previously.

At the instant t1, an image $INPUT\_IMAGE_f$ is captured by the image sensor.

Between the instant t1 and an instant t2, the image INPUT_IMAGE$_f$ is read and processed and the image LOGY_IMAGE$_f$ is generated. In other words, the voltage generated by each pixel is received by the circuit and thus the value of the various pixels are provided to the circuit implementing the method and a logarithmic function is applied.

Between the instant t1 and an instant t2, the mini-image MPIC$_f$ is also created based on the image LOGY_IMAGE$_f$ (block 104 of FIG. 1). Furthermore, the gain map GM$_f$ is generated (block 108 of FIG. 1), in parallel with the generation of the mini-image MPIC$_f$, based on the image LOGY_IMAGE$_f$ and the mini-image MPIC$_{f-1}$ generated previously.

At the instant t2, an image INPUT_IMAGE$_{f+1}$ is captured by the image sensor.

Between the instant t2 and an instant t3, the image INPUT_IMAGE$_{f+1}$ is read and processed and the image LOGY_IMAGE$_{f+1}$ is generated. In other words, the voltage generated by each pixel is received by the circuit and thus the value of the various pixels are provided to the circuit implementing the method and a logarithmic function is applied.

Between the instant t2 and an instant t3, the mini-image MPIC$_{f+1}$ is also created based on the image LOGY_IMAGE$_{f+1}$ (block 104 of FIG. 1). Furthermore, the gain map GM$_{f+1}$ is generated (block 108 of FIG. 1), in parallel with the generation of the mini-image MPIC$_{f+1}$, based on the image LOGY_IMAGE$_{f+1}$ and the mini-image MPIC$_f$ generated previously.

At the instant t3, a following image INPUT_IMAGE$_{f+2}$ is captured by the image sensor and the process continues.

The operation of creating a mini-image based on an image LOGY_IMAGE$_f$ may be applied to all the images of the succession of images.

Figure 3:
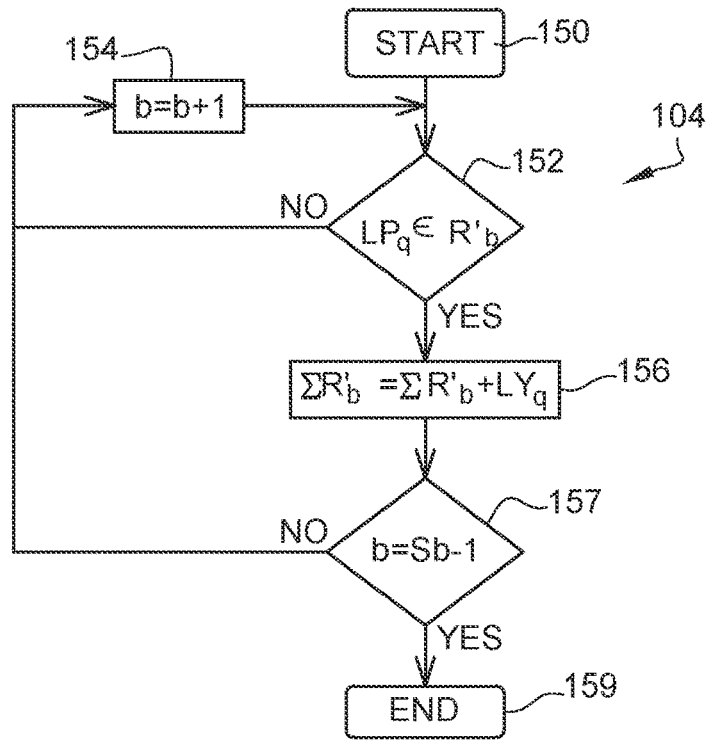
FIG. 3 is a flow diagram illustrating in more detail an operation of the embodiment of FIG. 1.
Figure 4:
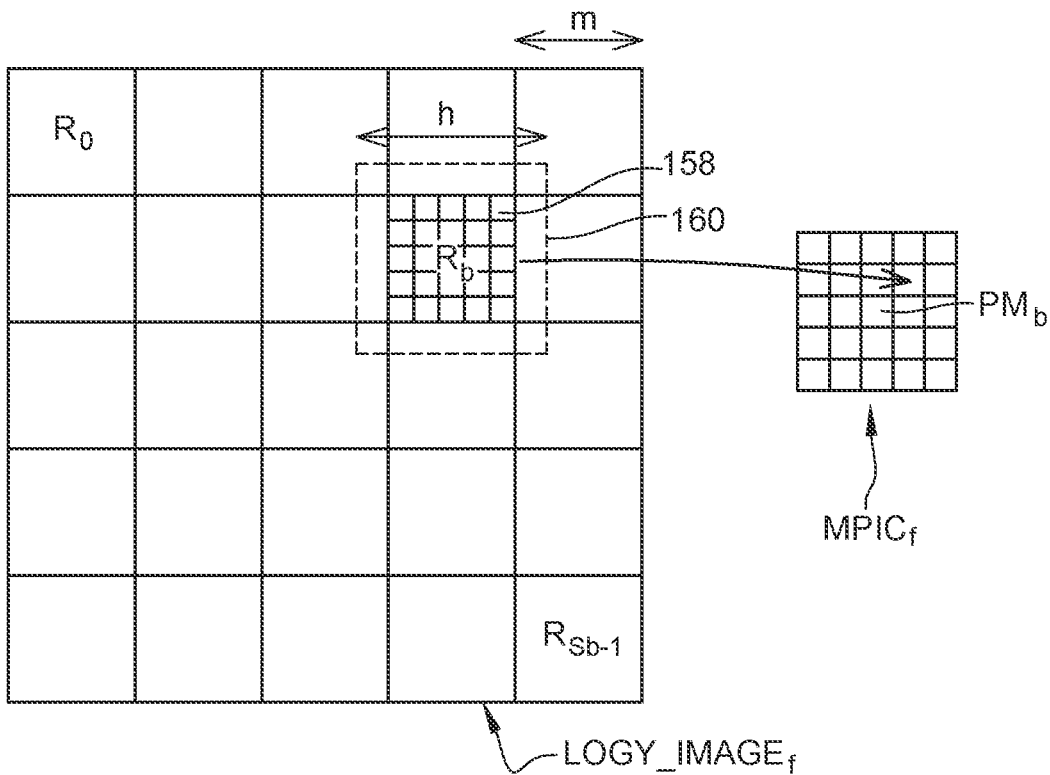
FIG. 4 represents an operation of FIG. 3.

FIG. 3 is a flow diagram illustrating in more detail the operation 104 of the embodiment of FIG. 1, and FIG. 4 represents an image during this operation 104. FIGS. 3 and 4 thus illustrate the creation of a mini-image. The value of each pixel of the mini-image may be an average intensity of a corresponding region in the image LOGY_IMAGE$_f$. To compute the average intensity, the values of all the pixels of the corresponding region are summed as the pixels go through the process, and the total sum is divided by the size of the corresponding region.

We consider that operation 104 is applied to an image LOGY_IMAGE$_f$ in order to create a mini-image MPIC$_f$, f being an integer in the range from 0 to n-1. More specifically, the operation described is applied to the pixel LP$_q$. The operation described in relation with FIG. 3 is repeated for each pixel, for example as they are provided to the circuit.

As illustrated in FIG. 4, the image LOGY_IMAGE$_f$ is divided into an array of sub-blocks R$_b$, b being the index of the pixel PM$_b$ of the mini-image MPIC$_f$ and the index of the corresponding sub-block R$_b$ of the image LOGY_IMAGE$_f$. The integer 1 goes from 0 to sb-1. The integer sb corresponds to the number of sub-blocks in the image LOGY_IMAGE$_f$. The integer sb may be higher than 2. In FIG. 4, the image LOGY_IMAGE$_f$ is divided into twenty-five sub-blocks arranged in five rows and five columns. The index b is therefore in the range from 0 to 24 in the example of FIG. 4. More generally, the number of rows can be different from the number of columns, as dictated by the aspect ratio of the image LOGY_IMAGE$_f$.

Each sub-block comprises an array of pixels 158 of the image LOGY_IMAGE$_f$. Typically, all the images may be formed of the same number of pixels 158. Alternatively, some of the sub-blocks, for example at the bottom and right-hand side, can have a different number of pixels, for example comprising less pixels. In an embodiment, the arrays of pixels 158 are square arrays, meaning they comprises the same number of rows as of columns of pixels.

The pixels of the mini-image are in the same order as the corresponding sub-blocks. As such, the pixel corresponding to a sub-block R$_b$ is surrounded by the pixels corresponding to the sub-blocks surrounding the sub-block R$_b$.

The division may be the same for all images LOGY_IMAGE$_f$ of the sequence of successive images. All images LOGY_IMAGE$_f$ are for example divided into an array of sub-blocks comprising the same number of sub-blocks, having the same number of rows of sub-blocks and the same number of columns of sub-blocks. If the pixels LP$_q$ of the image LOGY_IMAGE$_f$ correspond to the sub-block R$_b$ of LOGY_IMAGE$_f$, the pixel LP$_q$ of the image LOGY_IMAGE$_{f+1}$ correspond to the sub-block R$_b$ of LOGY_IMAGE$_{f+1}$.

The dimensions of the images INPUT_IMAGE$_f$ and thus of the images LOGY_IMAGE$_f$ depend on the image sensor that is used. The dimensions of the sub-blocks may be determined image by image, before the start of processing of each image.

Alternatively, the dimensions of the sub-blocks are for example determined before the start of the application of the method of the first image INPUT_IMAGE$_1$. When the image INPUT_IMAGE$_1$ is read, pixel by pixel, meaning that the value of each pixel is provided to the circuit implementing the method, each pixel has for example already been associated with a sub-block.

The operation 104 described herein updates the value of some of the pixels PM$_b$ of the mini-image MPIC$_f$ based on the values of a group 160 of pixels LP$_q$ of the image LOGY_IMAGE$_f$. Let R$_b$' be the group 160 corresponding to the pixel PM$_b$.

The value PM$_b$ is for example based on, and in some cases equal to, an average of the values LY$_q$ of the group 160 of pixels of the image LOGY_IMAGE$_f$. Alternatively, the value PM$_b$ is a median value of the values LY$_q$ of the group 160 of pixels, the minimum value of the values LY$_q$ of the group 160 of pixels, the maximum value of the values LY$_q$ of the group 160 of pixels or any function of the values LY$_q$ of the group 160 of pixels.

According to an embodiment, the group 160 of pixels includes all the pixels of the sub-block R$_b$ and only the pixels of the sub-block R$_b$.

According to another embodiment, the group of pixels 160 includes all the pixels of the sub-block R$_b$ and some pixels of the adjacent sub-blocks. For example, the group of pixels 160 includes all the pixels of the sub-block R$_b$ and pixels of the adjacent sub-blocks forming a ring around the sub-block R$_b$.

More generally, the group of pixels 160 may include all the pixels inside a square region centered on the sub-block.

Let m represent the size of each sub-block. In some embodiments, the sub-blocks are square, and m is the width or length of the sub-block, expressed as a number of pixels. Each sub-block is for example a square of m pixels by m pixels. The group of pixels is for example a square whose size h is given by the formula: h=floor(k*m), where floor represent a function giving the highest integer inferior to the variable of the function, and where k is a number strictly greater than 0. The number k is, for example, equal to or greater than 1. Indeed, if k is lesser than 1, some pixels of the image LOGY_IMAGE$_f$ are not considered in the computation of the mini-image. The number k can be chosen by a user, or can be programmed, for example, preprogramed. For example, the values k, m and h are identical for all images of the sequence.

At the beginning of the computation of the mini-image (FIG. 3, block 150, START), in other words, when the first pixel of one of the images INPUT_IMAGE$_f$ is provided to the circuit implementing the method, the index q is equal to 0, corresponding to the first pixel. Furthermore, the index 1 corresponding to the current pixel PM$_b$ is equal to 0, and the value $\Sigma R_b$', corresponding to the cumulative sum of the values of the pixels of the group $R_b$', is equal to 0.

During the operation of block 104, the value LY$_q$ of the pixel LP$_q$ of the group $R_b$' is added to the value $\Sigma R_b$'. In other words, the values representative of the pixels of the mini-image are updated if the pixel on which the operation is carried out is part of the group 160 corresponding to these pixels of the mini-image. The process is described for a single pixel LP$_q$. The process is reiterated for each pixel during the process of the group 101 of FIG. 1.

More precisely, the circuit determines (block 152, LP$_q \in R_b$'), whether the pixel LP$_q$ is comprised in the group $R_b$' taken into account for the computation of the value of the pixel PM$_b$. If it is not the case (Branch NO of block 152), the index b is incremented (block 154, b=b+1) and the operation of block 152 is repeated until b has a value such that the pixel LP$_q$ is comprised in the group $R_b$'. If it is the case (Branch YES of block 152), the value $\Sigma R_b$' is updated (block 156, $\Sigma R_b$'=$\Sigma R_b$'+LY$_q$). More precisely, the value LY$_q$ of the pixel LP$_q$ is added to the current value of $\Sigma R_b$'.

The circuit then determines (block 157, b=sb−1) if this group $R_b$' is the last group of the image, and thus if the circuit has determined, for all the groups $R_b$', whether or not the pixel LP$_q$ belongs to the group. If it is not the case (Branch NO, block 157), the value b is incremented (block 154) and the process goes back to the step of block 152. If it is the case (Branch YES, block 157), the operation is finished (block 159, END). The value $\Sigma R_b$' is for example stored. The remaining operations of the method of FIG. 1 are then for example carried out.

Alternatively, one or several additional operations can be carried out on the value $\Sigma R_b$' in order to obtain the value of the pixel PM$_b$. For example, the value $\Sigma R_b$' can be divided by a value, for example by $h^2$, in order to generate an average value.

Alternatively, the operation of block 156, corresponding to the updating of a value used to determine the value of the pixel PM$_b$ can be a different operation. For example, the updated value corresponds to a minimum or maximum value between the value LY$_q$ and the current value of the pixel of the mini-image MPIC$_f$.

According to an embodiment, the process comprises a step during which the circuit compares the value LY$_q$ of the current pixel with a stored value, the stored value being the minimum value of the previous pixel of the image. If the stored value is higher than the value of the pixel, the value of the pixel is stored in place of the previously stored value. This value is for example used in the computation of a context value. A similar value representing the maximum value is for example generated.

The operation 104 represented in FIG. 3 is carried out for each image LOGY_IMAGE$_f$. Before the reiteration of the process for another image, the values of q, b and $\Sigma R_b$' are reset for example to 0.

The operations of FIG. 3 are for example carried out in parallel with other operations of the process, in particular with the operations 108 and 110 of FIG. 1.

As the number k, which is the ratio between each sub-block and the corresponding group 160, can be greater than 1 some pixels of the image IMAGE$_f$ can be used for the computing of several of the values of the mini-image MPIC$_f$.

An advantage of using a number k greater than 1, is that it decreases the risk of artefacts, especially edge artefacts, between the various regions. It also smoothens the passage from one region of the image LOGY_IMAGE$_f$ to the other.

Figure 5:
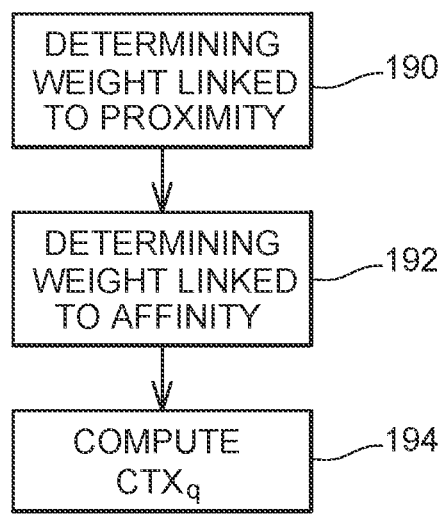
FIG. 5 is a flow diagram illustrating in more detail an operation of the embodiment of FIG. 1.

FIG. 5 is a flow diagram illustrating in more detail a step of generating the context value CTX$_q$.

This operation is described for a pixel LP$_q$ of a sub-block $R_b$ of an image LOGY_IMAGE$_f$.

During an operation 190 (DETERMINING WEIGHT LINKED TO PROXIMITY), the circuit determines weights $d_i$ for each sub-block $R_i$ of the image LOGY_IMAGE$_f$, the integer i being in the range from 0 to sb−1, sb being the number of sub-blocks in the image. Each weight $d_i$ is linked to the spatial proximity of the various sub-blocks to the pixel LP$_q$. For example, the circuit computes each weight $d_i$ based on the spatial proximity of the pixel LP$_q$ to the center of the sub-block $R_i$.

For example, the weight $d_i$ associated to a sub-block $R_i$ is computed as follows:

$$d_i = \max\left(0, 1 - \frac{\delta_i}{D_{max}}\right)$$

where $D_{max}$ is an arbitrary constant distance, for example programmed in a memory, and $\delta_i$ is the distance between the pixel LP$_q$ and the center of the sub-block $R_i$.

The value $\delta_i$ is for example computed as follows:

$$\delta_i = \sqrt{x_{diff}^2 + y_{diff}^2}$$

where $y_{diff}$ is the difference between the index of the row of the pixel LP$_q$ and the index of the row of the center of the sub_block $R_i$ and $x_{diff}$ is the difference between the index of the column of the pixel LP$_q$ in the array and the index of the column of the center of the sub_block $R_i$. The value $\delta_i$ may, for example, be an approximated value, in order to avoid the computation of a square root operation.

The value of $d_i$ is in this example in the range from 0 to 1. If a value of $d_i$ is equal to 0, which correspond to a value $\delta_i$ equal to, or greater than, $D_{max}$, the associated sub-block $R_i$ is not used in the computation, as it is not considered close enough to pixel LP$_q$.

The values of the weights $d_i$ are for example computed for each image of the succession of images. Alternatively, as the value of each weight $d_i$ is independent of the content of the images, and only depends on the size of the image and of the sub-block, the values of the weights $d_i$ are for example computed once and stored in order to be used for all the images.

Figure 6:
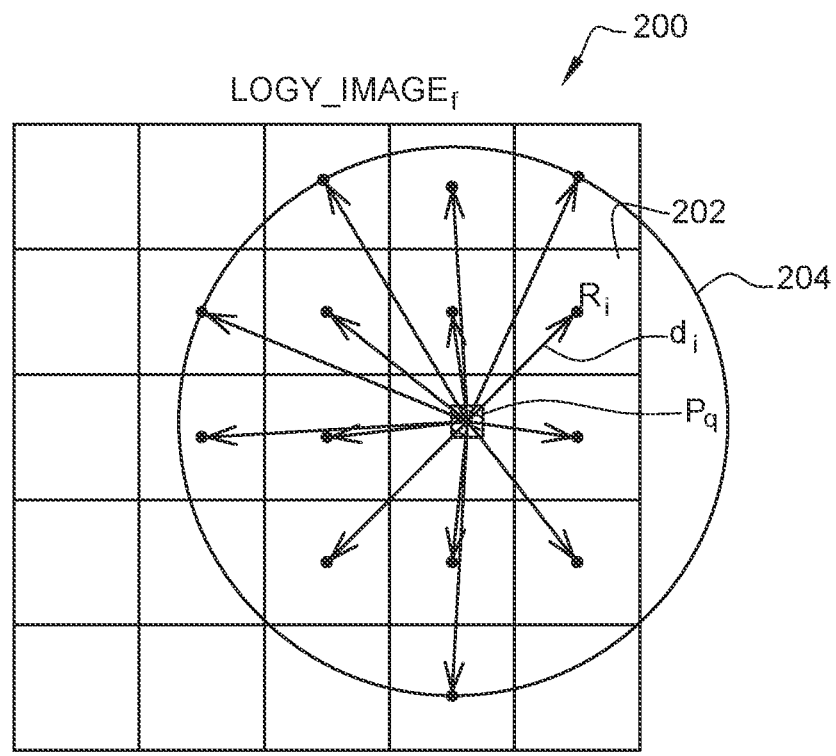
FIG. 6 represents part of an operation of determining a weight value.

FIG. 6 represents part of an operation of determining a weight value. FIG. 7 illustrates the determination of the weights $d_i$, linked to the spatial proximity of the sub-block $R_i$ to the pixel LP$_q$.

FIG. 6 represents an image LOGY_IMAGE$_f$ 200, divided into 25 sub-blocks 202. The pixel LP$_q$ is included in one of the sub-blocks.

The spatial proximity $d_i$ between the pixel LP$_q$ and the centers of the sub-blocks $R_i$ 202 has been computed. A border 204 delimits in FIG. 6 the sub-blocks that will not be used to compute the context value CTX$_q$ (outside the border 204), in other words, the pixels with a spatial proximity equal to 0, from the sub-blocks that can be used to compute the context value (inside the border 204), in other words, the pixels with a spatial proximity higher than 0.

Referring again to FIG. 5, during an operation 192 (DETERMINING WEIGHT LINKED TO AFFINITY), the circuit determines weights $a_j$, the integer j being in the range from 0 to sb−1. The weight $a_j$ is linked to the affinity of the pixel $PM_j$ with the pixel $LP_q$. For example, the closer the value of the pixel $PM_j$ to the value $LY_q$, the higher the affinity. The affinity represents the difference in intensity between the pixel $LP_q$ and the pixels $PM_j$ of the mini-image.

For example, the weight $a_j$ can be computed as follows:

$$a_j = \left[\max\left(0, 1 - \frac{|LY_q - LYM_j|}{\text{aff\_factor}*r*2^{fbw}}\right)\right]^4$$

where r is the difference between the highest and the lowest value of the intensity $LY_q$ of the pixels of the image $LOGY\_IMAGE_{f-1}$, fbw is a value representative of the number of bits used to code logarithmic values and aff_factor is a percentage. If the difference between the value of the intensity $LY_q$ and the value $LYM_j$ of the pixel $PM_j$ is greater than aff_factor*r, then the pixel $LP_q$ and the pixel $PM_j$ have no affinity. The value of $a_j$ is for example in the range from 0 to 1.

The values aff_factor and fbw may be the same for all the pixels of an image and may be the same for all the images of the sequence of images. The values aff_factor and fbw are for example chosen by the user or are programmed during the programing of the process. The value aff_factor may be, for example, in the range from 0 to 1, and may typically not be equal to 0.

Figure 7:
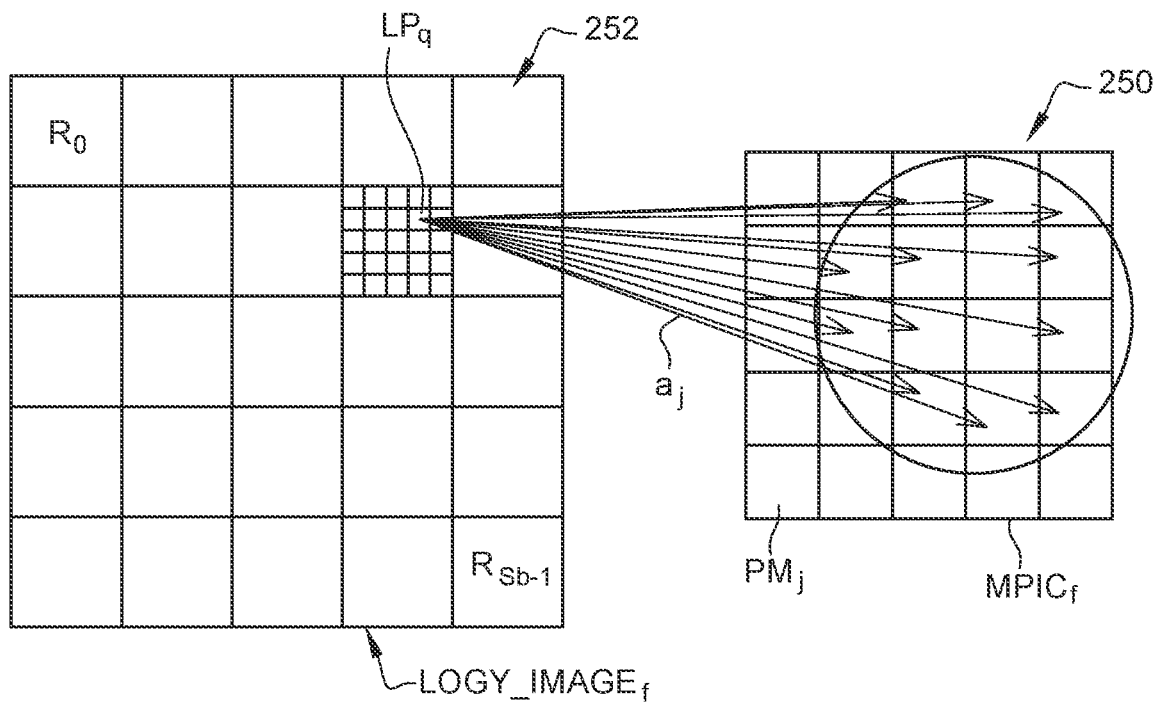
FIG. 7 represents another part of the operation of determining a weight value.

FIG. 7 represents the operation of determining a weight value $a_j$. FIG. 7 illustrates the determination of the weight $a_j$, linked to the affinity of the pixel $LP_q$ with the pixel $PM_j$.

FIG. 7 represents a mini-image $MPIC_f$ 250, divided into 25 pixels, corresponding to an image 252 $LOGY\_IMAGE_f$ comprising 25 regions $R_b$. The affinity $a_j$ between the pixel $LP_q$ and the pixel $PM_j$ has been computed.

For example, for a given pixel $LP_q$ of the image $LOGY\_IMAGE_f$, the sensor computes the values of the spatial proximity for all the sub-blocks of the image $LOGY\_IMAGE_f$. Afterwards, the device determines which sub-block have a spatial proximity different from 0 and computes the values of the affinity of the pixel with the pixels of the mini-image corresponding to those sub-blocks. Therefore, for a given pixel $LP_q$, the device does not compute the affinity between the pixel $LP_q$ of the image $LOGY\_IMAGE_f$ and the pixels of the mini-image which corresponds to sub-block having a spatial proximity equal to 0.

Referring again to FIG. 5, during an operation 194 (COMPUTE $CTX_q$), the circuit computes the context value $CTX_q$. The context value is for example a weighted average. For example, the context value is computed as follows:

$$CTX_q = ECTX_q * Likelihood_q + LY_q * (1 - Likelihood_q)$$

The value $ECTX_q$ corresponds for example to the estimated context value and is for example computed as follows:

$$ECTX_q = \frac{LY_q + \sum_{i=1}^{sb}(d_i * a_i * PM_i)}{1 + \sum_{i=1}^{sb}(d_i * a_i)}$$

The value $Likelihood_q$ corresponds to the likelihood that the estimated context value is an accurate representation of the context of the pixel or that it is neither too extreme in intensity or colorfulness. It is for example computed as follows:

$$Likelihood_q = Bias_q * Confidence_q * Greyness_q$$

The value $Confidence_q$ corresponds to the confidence in the estimated context and is computed as follows:

$$Confidence_q = \frac{1 + \sum_{i=1}^{sb}(d_i * a_i)}{1 + \sum_{i=1}^{sb}(d_i)}$$

The confidence is for example in the range from 0 to 1, including 0 and 1, as the weights $a_i$ and $d_i$ are in the same range.

The confidence $Confidence_q$ is substantially equal to 0 when the circuit considers that there is not enough information for the estimated context to be considered accurate. For example, the confidence is substantially equal to 0 for the pixels situated at the border between two different objects of the scene, at which point there is generally an abrupt variation in brightness and the sum of $d_i * a_i$ will be low.

The value $Bias_q$ corresponds to a variable referred to as the bias, and is for example computed as follows:

$$Bias_q = 1 - \left[\max\left(0, \frac{\left|normP_q - \frac{r}{2}\right|}{r/2} - (1 - 2*b_q)\right)\right]^2$$

where $normP_q$ is the normalized value of the intensity $LY_q$ of the pixel $P_q$. In other words, the value $normP_q$ is equal to the value of the pixel $LP_q$ minus the minimum value $LY_{qmin}$ of the previous image $LOGY\_IMAGE_f$. The number r is the range of the values of the previous image $LOGY\_IMAGE_f$, in other words, the number r is equal to the maximum value $LY_{qmax}$ of the intensity $LY_q$ of the image minus the minimum value $LY_{qmin}$. The maximum value of the number r is equal to the bit depth minus one. The value $b_q$ is representative of the parts at the extremity of the dynamic range in which the bias is lower than 1.

The value $b_q$ is for example equal to one of several values depending on the intensity value of the pixel $LP_q$. The possible values of the value $b_q$ are for example chosen by the user or programmed during the programing of the process.

Figure 8:
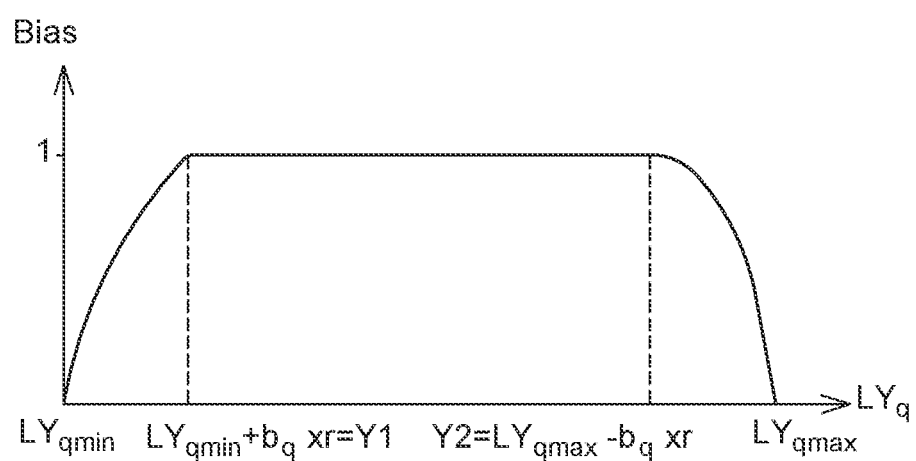
FIG. 8 illustrates the bias of a pixel as a function of the intensity.

FIG. 8 illustrates the bias $Bias_q$ associated with a pixel $P_q$ as a function of the intensity $LY_q$. The value of the bias increases from 0 to 1 between the minimum intensity value $LY_{qmin}$ and a value Y1 of the intensity equal to $Y1 = LY_{qmin} + b_q * r$. The value of the bias is constant between the value Y1 and a value Y2 equal to $Y2 = LY_{qmax} - b_q * r$. The value of the bias decreases from 1 to 0 between the value Y2 and the maximum value of the intensity $LY_{qmax}$.

The bias is used to avoid saturation of the brightest and darkest pixels. Indeed, if the intensity of the brightest pixels is increased too much, it will be difficult to distinguish detail. Similarly, if the intensity of the darkest pixels is lowered too much, it will also be difficult to distinguish detail.

When the value of bias is equal to 0, the likelihood is equal to 0 and therefore, no change is made to the pixel. For example, the gain value corresponding to the pixel is then equal to 1.

The value $\text{Greyness}_q$ is a variable referred to as the greyness and depends on a variable $G_q$, which may be computed as follows:

$$G_q = \max\left(0; 1 - s * \frac{\max_{R,Gr,Gb,B} LY_q - \min_{R,Gr,Gb,B} LY_q}{\max_{R,Gr,Gb,B} LY_q}\right)$$

where the number s is a sensitivity threshold, for example in the range from 0 to 1. The maximum or minimum values over R, Gr, Gb, B correspond to the minimum or maximum values among the red, green, and blue channels of the pixel. Alternatively, the red, green, and blue channels can be replaced by other channels, for example in the case of hyperspectral images.

The value s is for example chosen by the user or is programmed during the programing of the process.

If the variable $G_q$ is higher than a first threshold chosen by the user or programmed, the value $\text{Greyness}_q$ is equal to 1. If the variable $G_q$ is less than a second threshold, chosen by the user or programmed, the value $\text{Greyness}_q$ is equal to 1 minus the value s. The second threshold is lower than or equal to, for example, lower than, the first threshold. If the variable G is in the range from the second threshold to the first threshold, for example including the first and second thresholds, the value $\text{Greyness}_q$ is equal to the value $G_q$.

Similarly to the bias, the greyness is equal to 0 if, for a pixel, the value of a color is above a threshold, in which case the likelihood is also 0 and no change is made to the corresponding pixel.

If the images of the succession of images are in monochrome, the greyness is not computed.

The value of the likelihood $\text{Likelihood}_q$ may be substantially equal to 0, which means that the image will not be modified or, will be modified in a negligible way, when:
- the context cannot be considered accurate, in other words when the confidence $\text{Confidence}_q$ is substantially equal to 0; and/or
- when a modification of the value of the pixel would destroy information, for example when the intensity of the pixel above a threshold, or below a threshold or, in the case of a color pixel, if the color value of the pixel is above a threshold.

Figure 9:
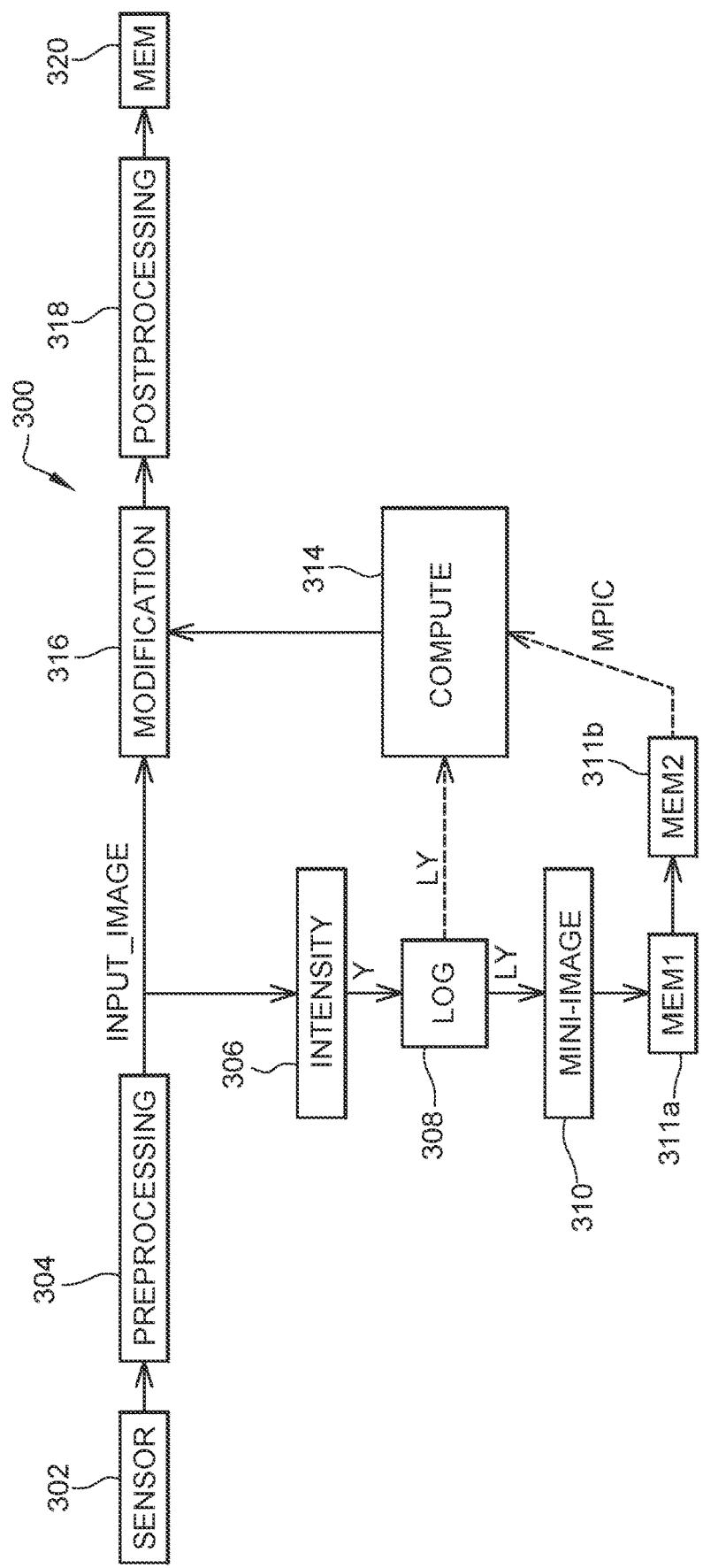
FIG. 9 illustrates a circuit providing an example implementation of the embodiment of FIG. 1.

FIG. 9 illustrates a circuit providing an example implementation of the embodiment of FIG. 1. More precisely, FIG. 9 represents the circuit 300 of the device, which implements the process of FIG. 1.

The circuit 300 for example comprises an image sensor 302 (SENSOR). The image sensor 302 for example comprises a Bayer sensor. The image sensor 302 is configured to capture successive images. For example, the image sensor 302 is able to capture images at video rates. In some embodiments, the image sensor 302 is configured to capture stills. The image sensor 302 may be a video camera.

The circuit 300 for example comprises a preprocessing circuit 304 (PREPROCESSING). The preprocessing circuit 304 receives, as an input, the images captured by the image sensor 302. The output of the preprocessing unit corresponds, in this example, to the pixels of one of the images INPUT_IMAGE.

The circuit 300 for example comprises a circuit 306 (INTENSITY). The circuit 306 computes the value $Y_q$ corresponding to the pixel $P_q$ being sent by the circuit 304.

The circuit 300 for example comprises a circuit 308 (LOG) configured to implement a logarithmic function, for example with base 2, on the value of the intensity $Y_q$ and generate the corresponding value $LY_q$.

The circuit 300 for example comprises a circuit 310 (MINI-IMAGE) configured to create the mini-image $\text{MPIC}_f$ from the values $LY_q$ generated by the circuit 308. The circuit 310 for example comprises a memory configured to store the mini-images created. As illustrated, the memory comprises a region 311a (MEM1) in which the mini-image $\text{MPIC}_f$ that is created is stored and a region 311b (MEM2) in which the mini-image $\text{MPIC}_{f-1}$ created based on the previous image is stored. The mini-image $\text{MPIC}_{f-1}$ stored in the region 311b may be erased when the modification of the image $\text{INPUT\_IMAGE}_f$ is completed, and the mini-image $\text{MPIC}_f$ having just been created may be moved from region 311a to region 311b.

The circuit 300 for example comprises a circuit 314 (COMPUTE) configured to compute the gain map to be applied to the image $\text{INPUT\_IMAGE}_f$ in order to obtain the image $\text{OUTPUT\_IMAGE}_f$. More specifically, the circuit 314 computes the gain value $\text{GMP}_q$ corresponding to the pixel $P_q$ as described above.

The circuit 300 for example comprises a circuit 316 (MODIFICATION) configured to apply the gain map to the image $\text{INPUT\_IMAGE}_f$ and more specifically, to multiply the gain value $\text{GMP}_q$ and the value of the pixel $P_q$.

The circuit 300 for example comprises a circuit 318 (POSTPROCESSING) configured to implement other functions. The other functions may include other tone mapping processes and other processes of image processing.

The circuit 300 for example comprises a circuit 320 (MEM), for example a memory, configured to store the output image. Alternatively, the output image is not stored. The output image is for example only displayed.

In this example, the circuit is at least partially implemented in hardware. The circuit may, for example, comprise a software part.

In an embodiment, some or all of the circuits of the circuit 300, except for example for the circuits 310 and 314, are shared by at least two processes of image processing. As such, the addition of the process of local tone mapping described herein may only involve the addition of circuits 310 and 314, which is advantageous in terms of silicon area and cost, as the number of hardware blocks is limited.

Figure 10:
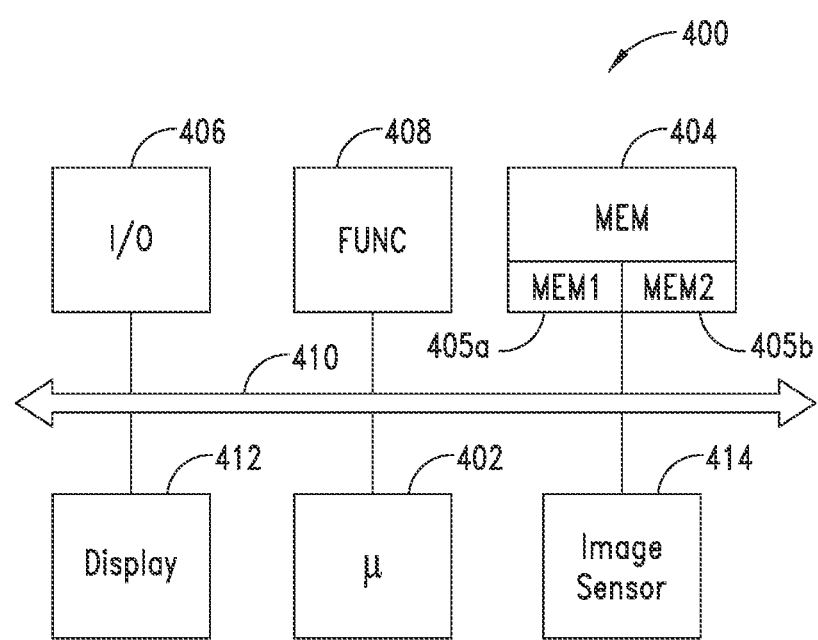
FIG. 10 illustrates a processing device providing another example of implementation of the embodiment of FIG. 1.

FIG. 10 illustrates a processing device providing another example of implementation of the embodiment of FIG. 1. This example represents an implementation entirely by way of software.

The circuit 400 implementing the process of tone mapping described in relation with FIG. 1 comprises a microprocessor, or a microcontroller 402 (p). The microprocessor implements the various operations of computation and of modification of the pixels comprised in the embodiment of FIG. 1.

The circuit 400 also comprises at least one memory (MEM) 404. The memory, or memories, 404 are for example non-transitory memories configured to store at least the mini-images and the output image. The memory 404 comprises a region 405a (MEM1) in which the mini-image $\text{MPIC}_f$ being created is stored and a region 405b (MEM2), in which the mini-image $\text{MPIC}_{f-1}$, created based on the previous image is stored. In an embodiment, the mini-image $\text{MPIC}_{f-1}$ stored in the region 405b is erased when the modification of the image $\text{INPUT\_IMAGE}_f$ is completed, and the mini-image $\text{MPIC}_f$ having just been created is moved from region 405a to region 405b.

The circuit 400 comprises an input/output interface 406 (I/O). For example, the interface 406 is coupled with an image sensor in a similar fashion to the image sensor described in relation with FIG. 10.

The circuit 400 typically may comprise at least one other function 408 (FUNC). As illustrated, the circuit 400 is a system comprising a display 412 and an image sensor 414, such as a camera.

The various elements of the circuit 400, in particular the microprocessor 402, the memory or memories 404, the interface 406 and the functions 408, are coupled together via a bus 410. Various information, such as the information concerning the images $IMAGE_f$ and the output image, is for example transmitted over the bus 410.

An advantage of the embodiments described herein is that, as the image $IMAGE_f$ generated by the image sensor is not stored, the memory requirement is relatively small. Indeed, the storage of two mini-images is significantly less costly than the storage of an image $IMAGE_f$. In a traditional regional tone mapping operation, a number of rows equal to the number of rows of the original image would need to be stored.

Another advantage of an embodiment is that, as each pixel of a mini-image corresponds to an average of a bigger area, there are few differences between a mini-image and the following one. Therefore, it is possible to use a mini-image, generated using a first image, to process the following image of the successive images. Furthermore, it is possible to process the pixels with the previous mini-image, as they are caught and read by the sensor. Indeed, the mini-image is already fully available when we process the pixel. There is, therefore, no delay in this part of the processing.

Another advantage of an embodiment is that the use of a logarithmic value for the creation of the mini-image allows the process not to be limited by the bit depth. It is therefore possible to use this process on images having a high dynamic and to obtain an output image with the same a high dynamic.

Another advantage of the embodiments described herein is that the size of the mini-image can be chosen for a given sequence of successive images. The bigger the mini-image, the more precise the tone mapping. However, increasing the size of the mini-image increases the size of the memory needed to store the mini-images. Being able to choose the size of the mini-image in regard with the input image allows to determine a compromise between memory space and precision depending on the application.

Another advantage of the embodiments described herein is that, in the computations, the pixels of the images are compared with pixels of the mini-image. Therefore, there are less comparisons and less computations than if it was needed to compare with as many pixels as there are in the images of the succession of images.

Various embodiments and variants have been described. Those skilled in the art will understand that certain features of these embodiments can be combined and other variants will readily occur to those skilled in the art. In particular, the succession of images on which the method is applied may be part of a larger group of images. For example, the succession of images comprises an image out of Z images of the larger group of images, Z being an integer higher than or equal to 2.

Alternatively, the method can be applied to a sequence of successive images stored in a memory. The method may then be identical at the exception of the fact that the input images come from a storage element instead of a sensor.

Finally, the practical implementation of the embodiments and variants described herein is within the capabilities of those skilled in the art based on the functional description provided hereinabove.

Some embodiments may take the form of or comprise computer program products. For example, according to one embodiment there is provided a computer readable medium comprising a computer program adapted to perform one or more of the methods or functions described above. The medium may be a physical storage medium, such as for example a Read Only Memory (ROM) chip, or a disk such as a Digital Versatile Disk (DVD-ROM), Compact Disk (CD-ROM), a hard disk, a memory, a network, or a portable media article to be read by an appropriate drive or via an appropriate connection, including as encoded in one or more barcodes or other related codes stored on one or more such computer-readable mediums and being readable by an appropriate reader device.

Furthermore, in some embodiments, some or all of the methods and/or functionality may be implemented or provided in other manners, such as at least partially in firmware and/or hardware, including, but not limited to, one or more application-specific integrated circuits (ASICs), digital signal processors, discrete circuitry, logic gates, standard integrated circuits, controllers (e.g., by executing appropriate instructions, and including microcontrollers and/or embedded controllers), field-programmable gate arrays (FPGAs), complex programmable logic devices (CPLDs), etc., as well as devices that employ RFID technology, and various combinations thereof.

The various embodiments described above can be combined to provide further embodiments. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A tone mapping method of an image processing device, the method comprising:
    dividing a first image of a succession of images into a plurality of sub-blocks of pixels;
    applying a logarithmic function to an intensity of each pixel of the first image;
    generating a first mini-image comprising pixels, each pixel of the first mini-image representing a corresponding sub-block of the first image, an intensity of each pixel of the first mini-image being representative of an intensity of the pixels of the corresponding sub-block after application of the logarithmic function to the pixels of the corresponding sub-block;
    storing, the first mini-image in a memory; and
    modifying a second image of the succession of images based on the first mini-image, generating an output image, wherein the modifying the second image comprises applying, to each pixel of the second image, a gain value $GMP_q$ according to:

$$GMP_q = (LOCAL\_GAIN_q - 1) * GLOBAL\_POWER + 1,$$

where GLOBAL_POWER is a value representing an influence of the modification on the whole image and LOCAL_

GAIN$_q$ is a local contrast gain, computed based on a logarithmic representation of the second image and the mini-image of the first image.

2. The method of claim 1, wherein the modifying comprises, for each pixel of the second image:
computing of a context value, the context value depending on:
a spatial proximity between the pixel of the second image and centers of sub-blocks of the second image adjacent to a sub-block of the second image comprising the pixel of the second image; and
an affinity in intensity between the pixel of the second image and pixels of the first mini-image; and
using the context value to generate the local contrast gain.

3. The method of claim 2, wherein each pixel OUTPUT_P$_q$ of the output image is equal to OUTPUT_P$_q$=GMP$_q$*P$_q$, where P$_q$ represents a value of a channel of the pixel, and OUTPUT_P$_q$ represents a value of the corresponding channel in the output image.

4. The method of claim 1, comprising storing the output image in the memory or another memory or displaying the output image.

5. The method of claim 1, wherein each sub-block comprises at least two pixels.

6. The method of claim 1, wherein the intensity of each pixel of the first mini-image is computed based on an average of the intensities of the pixels of the corresponding sub-block.

7. The method of claim 1, wherein the intensity of each pixel of the first mini-image is computed based on:
an average of the intensities of the pixels in a square centered on the corresponding sub-block, a size of the square being equal to k times the size of the sub-block, k being a number between 0 and 2, not including 0; or
an average of the intensities of the pixels in a circle centered on the corresponding sub-block, a radius of the circle being equal to k times the size of the sub-block, k being a number between 0 and 2, not including 0.

8. The method of claim 1, wherein the first mini-image used for the generation of the output image is erased from the memory after the generation of the output image.

9. The method of claim 1, wherein a respective mini-image is generated for all the images of the succession of images.

10. The method of claim 2, wherein the modification of the pixel of the second image is independent of the context value if:
the intensity of the pixel is above a first threshold, or below a second threshold;
the pixel is a color pixel and the intensity of one of the colors of the pixel is above a third threshold;
an accuracy of the context value is below a fourth threshold; or
combinations thereof.

11. A device, comprising:
a memory; and
image processing circuitry coupled to the memory, wherein the image processing circuitry, in operation:
divides a first image of a succession of images into a plurality of sub-blocks of pixels;
applies a logarithmic function to an intensity of each pixel of the first image;
generates a first mini-image comprising pixels, each pixel of the first mini-image representing a corresponding sub-block of the first image, an intensity of each pixel of the first mini-image being representative of an intensity of the pixels of the corresponding sub-block after application of the logarithmic function to the pixels of the corresponding sub-block;
stores the first mini-image; and
applies tone mapping to a second image of the succession of images based on the first mini-image, generating an output image, wherein the applying tone mapping comprises applying, to each pixel of the second image, a gain value GMP$_q$ according to:

$$GMP_q = (LOCAL\_GAIN_q - 1) * GLOBAL\_POWER + 1,$$

where GLOBAL_POWER is a value representing an influence of the tone mapping on the whole image and LOCAL_GAIN$_q$ is a local contrast gain, computed based on a logarithmic representation of the second image and the mini-image of the first image.

12. The device of claim 11, wherein the image processing circuitry, in operation, for each pixel of the second image:
computes a context value, the context value depending on:
a spatial proximity between the pixel of the second image and centers of sub-blocks of the second image adjacent to a sub-block of the second image comprising the pixel of the second image; and
an affinity in intensity between the pixel of the second image and pixels of the first mini-image; and
uses the context value to generate a value of the local contrast gain.

13. The device of claim 12, wherein each pixel OUTPUT_P$_q$ of the output image is equal to OUTPUT_P$_q$=GMP$_q$*P$_q$, where P$_q$ represents a value of a channel of the pixel, and OUTPUT_P$_q$ represents a value of the corresponding channel in the output image.

14. The device of claim 11, wherein each sub-block comprises a plurality of pixels.

15. The device of claim 11, wherein the intensity of each pixel of the first mini-image is computed based on an average of the intensities of the pixels of the corresponding sub-block.

16. The device of claim 11, wherein the intensity of each pixel of the first mini-image is computed based on:
an average of the intensities of the pixels in a square centered on the corresponding sub-block, a size of the square being equal to k times the size of the sub-block, k being a number between 0 and 2, not including 0; or
an average of the intensities of the pixels in a circle centered on the corresponding sub-block, a radius of the circle being equal to k times the size of the sub-block, k being a number between 0 and 2, not including 0.

17. The device of claim 11, wherein the image processing circuitry, in operation, replaces the first mini-image used for the generation of the output image with a mini-image of the second image after the generation of the output image.

18. The device of claim 11, wherein the image processing circuitry, in operation, successively generates a respective mini-image for the images of the succession of images.

19. A system, comprising:
a display, which, in operation, displays images; and
image processing circuitry coupled to the display, wherein the image processing circuitry, in operation:
divides a first image of a succession of images into a plurality of sub-blocks of pixels;
applies a logarithmic function to an intensity of each pixel of the first image;
generates a first mini-image comprising pixels, each pixel of the first mini-image representing a corresponding sub-block of the first image, an intensity of each pixel of the first mini-image being representative of an intensity of the pixels of the corresponding sub-block after application of the logarithmic function to the pixels of the corresponding sub-block;

stores the first mini-image; and applies tone mapping to a second image of the succession of images based on the first mini-image, generating an output image, wherein the applying tone mapping comprises applying, to each pixel of the second image, a gain value $GMP_q$ according to:

$$GMP_q = (LOCAL\_GAIN_q - 1) * GLOBAL\_POWER + 1,$$

where GLOBAL_POWER is a value representing an influence of the tone mapping on the whole image and $LOCAL\_GAIN_q$ is a local contrast gain, computed based on a logarithmic representation of the second image and the mini-image of the first image.

20. The system of claim 19, wherein the display, in operation, displays the output image.

21. The system of claim 19, wherein the image processing circuitry, in operation, for each pixel of the second image:

computes a context value, the context value depending on:

a spatial proximity between the pixel of the second image and centers of sub-blocks of the second image adjacent to a sub-block of the second image comprising the pixel of the second image; and an affinity in intensity between the pixel of the second image and the pixels of the first mini-image; and uses the context value to generate a value of the local contrast gain.

22. A non-transitory computer-readable medium having contents which cause image processing circuitry to perform a tone mapping method, the tone mapping method comprising:

dividing a first image of a succession of images into a plurality of sub-blocks of pixels;

applying a logarithmic function to an intensity of each pixel of the first image;

generating a first mini-image comprising pixels, each pixel of the first mini-image representing a corresponding sub-block of the first image, an intensity of each pixel of the first mini-image being representative of an intensity of the pixels of the corresponding sub-block after application of the logarithmic function to the pixels of the corresponding sub-block;

storing, the first mini-image in a memory; and modifying a second image of the succession of images based on the first mini-image, generating an output image, wherein the modifying comprises applying, to each pixel of the second image, a gain value $GMP_q$ according to:

$$GMP_q = (LOCAL\_GAIN_q - 1) * GLOBAL\_POWER + 1,$$

where GLOBAL_POWER is a value representing an influence of the modifying on the whole image and $LOCAL\_GAIN_q$ is a local contrast gain, computed based on a logarithmic representation of the second image and the mini-image of the first image.

23. The non-transitory computer-readable medium of claim 22, wherein the modifying comprises, for each pixel of the second image:

computing of a context value, the context value depending on:

a spatial proximity between the pixel of the second image and centers of sub-blocks of the second image adjacent to a sub-block of the second image comprising the pixel of the second image; and an affinity in intensity between the pixel of the second image and pixels of the first mini-image; and using the context value to generate a value of the local contrast gain.

24. The non-transitory computer-readable medium of claim 22, wherein the contents comprise instructions executed by the image processing circuitry.

* * * * *